Sept. 18, 1956     P. B. MAUER ET AL     2,763,786
CRYSTAL TYPE DOSIMETER
Filed July 22, 1952
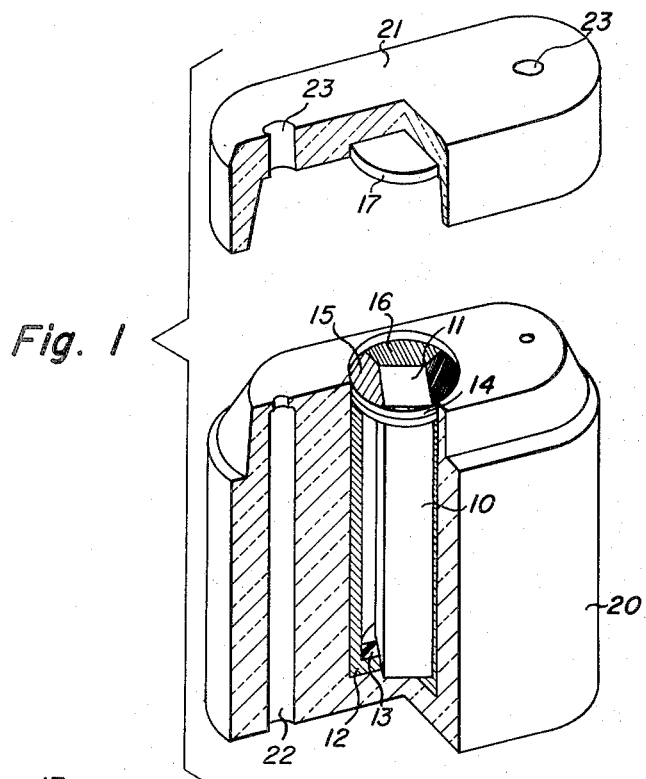
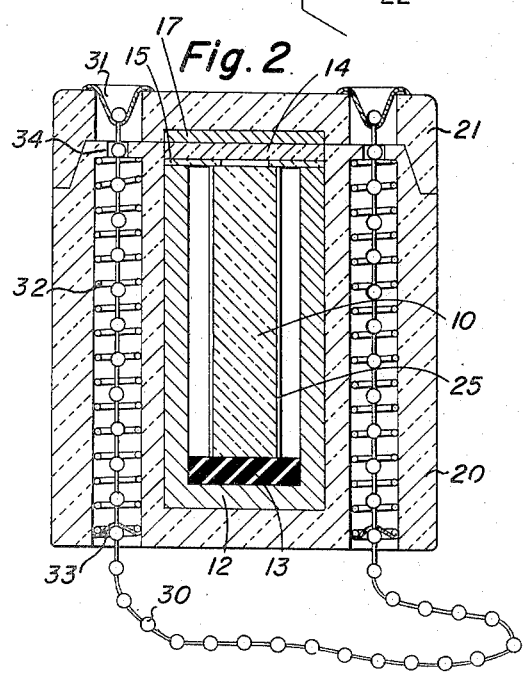
PAUL B. MAUER
CLARENCE R. TAYLOR
INVENTORS
BY
ATTORNEYS United States Patent Office 2,763,786
Patented Sept. 18, 1956

2,763,786

CRYSTAL TYPE DOSIMETER

Paul B. Mauer and Clarence R. Taylor, Rochester, N. Y., assignors to Eastman Kodak Company, Rochester, N. Y., a corporation of New Jersey Application July 22, 1952, Serial No. 300,174

6 Claims. (Cl. 250—83)

This invention relates to devices for measuring exposure to X-rays, gamma rays, and the like.

Certain crystals have been found which change color upon exposure to radiation and the effect is cumulative so that the degree of change is a measure of the total amount of the irradiation of the crystal. Potassium bromide containing so-called "U" centers is more or less transparent, but after exposure to X-rays, gamma rays, or the like, the crystals revert to an arrangement having "F" centers which absorb red light so the crystal appears blue. In order to obtain the highest sensitivity it is customary to use the crystals in a condition of high transparency so that even slight changes in color are more apparent. At the same time it is preferable to keep the crystal in a container which tends to absorb any low energy radiation so as to control the degree of darkening. It is the object of one feature of the present invention to provide means for enhancing the apparent darkening of the crystal. This is accomplished by making up the crystal in the form of an integrating tube (acting like a light integrating sphere) and then viewing the crystal from the same side on which the light is incident. The light thus passes on the average twice through the crystal, so that even a relatively slight darkening of the crystal is enhanced.

According to the invention a crystal type dosimeter is made up with a radiation-sensitive crystal completely surrounded, except in the area to be viewed, with a white material such as a white coating on the crystal itself. Alternatively, the white material may be spaced from the crystal. The whole unit is placed in a container having a removable (openable) cover. At least part of the material of the container is such that it partly absorbs the radiation under test. When the cover is opened the exposed end of the crystal is illuminated with white light and the color thereof is noted. The exposure of the dosimeter to critical radiation is made through the container and the openable cover is merely for viewing and judging the color of the crystal. The container and cover are normally opaque to prevent any darkening of the crystal other than by the radiation under test. Also, for convenience, the container includes a plastic jacket, both around the main housing and around the cover.

In a preferred embodiment of the invention, a plurality of comparison patches are included adjacent to the area or end of the crystal to be viewed and the colors of these patches are such that they respectively match the color of the crystal at different stages of irradiation.

In order to protect the crystal, it is preferable to include a transparent window in the container under the cover with the crystal arranged so that the viewing end thereof is adjacent to the window. The seal between the window and the container is preferably moisture-proof so that the crystal is maintained in a moisture-free chamber. Preferably, also, the crystal is supported on a shock absorbing cushion so that it will withstand at least fairly rough handling. Using potassium bromide crystals of the type described above and in more detail below, it is convenient to make the container of cadmium with a plastic window and with a plastic jacket. Also, it is preferable to have the cover attached to the rest of the housing by some suitable spring arrangement so that it snaps closed except when actual readings are being taken.

As an example of radiation-sensitive crystals, one form may be prepared as follows: Potassium bromide crystal is cut to the desired size and then enclosed in a pure nickel container along with either potassium or sodium metal and then heated for 30 minutes at 670° C. (e. g., in a salt bath). The container is then quenched in cold water. This forms "F" centers in the crystal as evidenced by a dark blue coloring. The crystals are then enclosed in another pure nickel container in a pure hydrogen atmosphere at 30 atmospheres of pressure and it is again heated in a salt bath at 430° C. for 30 minutes. The container is then air cooled and the crystals are then removed and are found to contain "U" centers as evidenced by a clear transparent color similar to the original crystal. These final crystals may then be cleaned and cut or polished to the correct size for use in the dosimeter.

According to the invention the crystal is then painted with white paint on all sides except the end which is to be viewed and which is to be adjacent to the clear plastic window in the final container.

Other features of the invention will be apparent from the following description when read in connection with the accompanying drawing in which:

Fig. 1 is a perspective view partly cut away of a preferred embodiment of the invention.

Fig. 2 is a vertical section of the embodiment shown in Fig. 1.

In the drawing a sensitized potassium bromide crystal 10 having a viewing area or end 11 is mounted in a cadmium housing 12 having a cadmium cover 17. Actually the cover is spaced from the rest of the housing by the thickness of the plastic window 14 but this is a negligible radiation leak. The crystal 10 is supported on a cushion 13 of rubber and held thereby in firm contact with the plastic window 14 in the main body of the housing. Surrounding the viewing end 11 of the crystal are patches of blue-colored paper of increasing density including steps 15 and 16 which match the apparent color of the crystal 10 as viewed through the end 11, after different degrees of irradiation.

As shown partly in Fig. 2, the surface of the crystal 10 is provided with a white coating 25. The surface of the cushion 13 adjacent to the crystal is also white or the end of the crystal is painted with the same coating as the sides. The other end of the crystal 11 is not covered. The white material surrounding the crystal need not be a coating on the crystal itself and may be spaced slightly from the crystal, but it is simpler to manufacture by a process which merely involves painting the crystal.

The cadmium housing 12 and cover 17 are both provided with plastic jackets 20 and 21 suitably shaped for convenient carrying in the pocket. The chain for attaching the cap or cover to the housing is not shown in Fig. 1 but is shown in Fig. 2. It consists of a bead chain fastened to the cover 21 by suitable clips 31 and part way down the chain it is held by clips 33 to springs 32 which are compressed when the cover is removed from the container. When the cover is released, the springs 32 cause it to snap back in place as shown in Fig. 2 and the bead chain 30 provides a convenient handle for carrying the dosimeter which is actually quite small, the overall size of the unit being only about one inch high. The unit is quite convenient for a person to carry in the pocket and may be examined at any time to determine whether the total exposure to extremely short wave radiation such as gamma or X-ray, has been excessive.

We claim:

1. A crystal dosimeter comprising an elongated radiation sensitive crystal which darkens when irradiated by the radiation under test, a white material surrounding substantially all surfaces of the crystal except one end, a container of material which partly absorbs said radiation, an openable cover for the container, a transparent window in the container under said cover and shock cushioning supporting means in the container holding said crystal with said one end adjacent said window.

2. A dosimeter according to claim 1 having adjacent said window a plurality of comparison patches matching the color of the crystal as seen through the window at different stages of irradiation.

3. A crystal dosimeter comprising an elongated crystal of fairly transparent potassium bromide having "U" centers which, by the formation of "F" centers, darkens when irradiated by the radiation under test, a white material surrounding substantially all surfaces of the crystal except one end, a container of material which partly absorbs said radiation, an openable cover for the container, a transparent window in the container under said cover and shock cushioning supporting means in the container holding said crystal with said one end against said window.

4. A dosimeter according to claim 3 having adjacent said window a plurality of comparison patches matching the color of the crystal as seen through the window at different stages of irradiation.

5. A dosimeter according to claim 3 in which the container comprises cadmium.

6. A dosimeter according to claim 3 in which the window forms a substantially moisture-proof seal with the container and the window and container form a substantially moisture-proof cell for the crystal.

References Cited in the file of this patent

UNITED STATES PATENTS

| | | |
|---|---|---|
| 2,673,934 | Friedman | Mar. 30, 1954 |
| 2,700,736 | Roberts | Jan. 25, 1955 |